United States Patent [19]
Takamiya et al.

[11] Patent Number: 5,327,309
[45] Date of Patent: Jul. 5, 1994

[54] DISK DRIVE APPARATUS WITH SHUTTER LOCKING MECHANISM WHICH IS PREVENTIVE OF PLAY OF DISK CARTRIDGE IN LOADING CONDITION

[75] Inventors: Tooru Takamiya, Kanagawa; Hiroshi Miyoshi; Osamu Ito, both of Tokyo; Kiyoshi Ohmori, Miyagi, all of Japan

[73] Assignee: Sony Corporation, Tokyo, Japan

[21] Appl. No.: 540,853

[22] Filed: Jun. 20, 1990

[30] Foreign Application Priority Data

Jun. 23, 1989 [JP] Japan ................................ 1-161952
Jun. 23, 1989 [JP] Japan ................................ 1-161953

[51] Int. Cl.⁵ ............................................. G11B 5/016
[52] U.S. Cl. ............................ 360/99.02; 360/99.06
[58] Field of Search ................ 369/75.2, 77.1, 77.2, 369/291; 360/99.02, 99.03, 99.06, 99.07, 133

[56] References Cited

U.S. PATENT DOCUMENTS

| | | |
|---|---|---|
| 4,651,240 | 3/1987 | Okita et al. |
| 4,656,542 | 4/1987 | Shibata ........................ 360/99.02 X |
| 4,686,594 | 8/1987 | Kurafuji ....................... 360/99.02 X |
| 4,750,063 | 6/1988 | Kume et al. ................... 360/99.02 X |
| 4,750,065 | 6/1988 | Masaki et al. ................. 360/99.02 X |
| 4,786,998 | 11/1988 | Sugawara et al. .............. 360/99.06 X |
| 4,816,945 | 3/1989 | Watanabe . |
| 4,833,553 | 5/1989 | Noda et al. . |
| 4,864,440 | 9/1989 | Satoh et al. ........................ 360/99.02 |
| 4,879,616 | 11/1989 | Ando ............................. 360/99.03 X |
| 4,901,174 | 2/1990 | Saito et al. ....................... 360/99.06 |
| 4,918,553 | 4/1990 | Suzuki et al. .................... 360/99.06 |
| 4,964,005 | 10/1990 | Uzuki .............................. 360/99.06 |

FOREIGN PATENT DOCUMENTS

| | | |
|---|---|---|
| 0219415A2 | 4/1987 | European Pat. Off. ... G11B 17/035 |
| 0250111A3 | 12/1987 | European Pat. Off. ...... G11B 23/03 |
| 2190532A | 11/1987 | United Kingdom ......... G11B 17/04 |

Primary Examiner—Eugene R. LaRoche
Assistant Examiner—Christopher R. Glembocki
Attorney, Agent, or Firm—Limbach & Limbach

[57] ABSTRACT

A disk drive apparatus includes a shutter operating pin engageable with a pin receptacle on the shutter of a disk cartridge. The shutter operating pin is carried by a shutter operating arm which is pivotable for causing a transverse shift of the shutter operating pin for shifting the shutter from a closed position, at which a disk is inaccessible, to an open position, at which the disk is accessible. An arm lock mechanism is provided for locking the shutter operating arm at the shutter fully opened position. The arm lock mechanism is provided in the cartridge holder. The cartridge holder is also provided with a cartridge lock mechanism which includes a cartridge lock pin engageable with a lock pin receptacle on the disk cartridge. The cartridge lock mechanism is actuated by means of the shutter operating arm at the shutter fully opened position, to establish locking engagement of the cartridge lock pin with the lock pin receptacle of the disk cartridge.

2 Claims, 8 Drawing Sheets

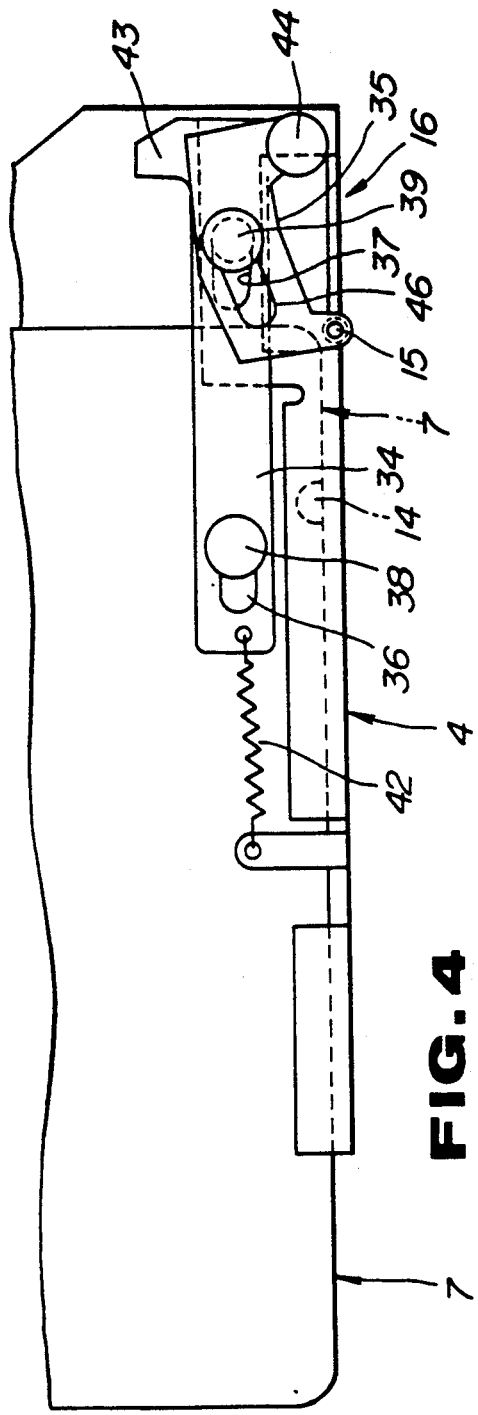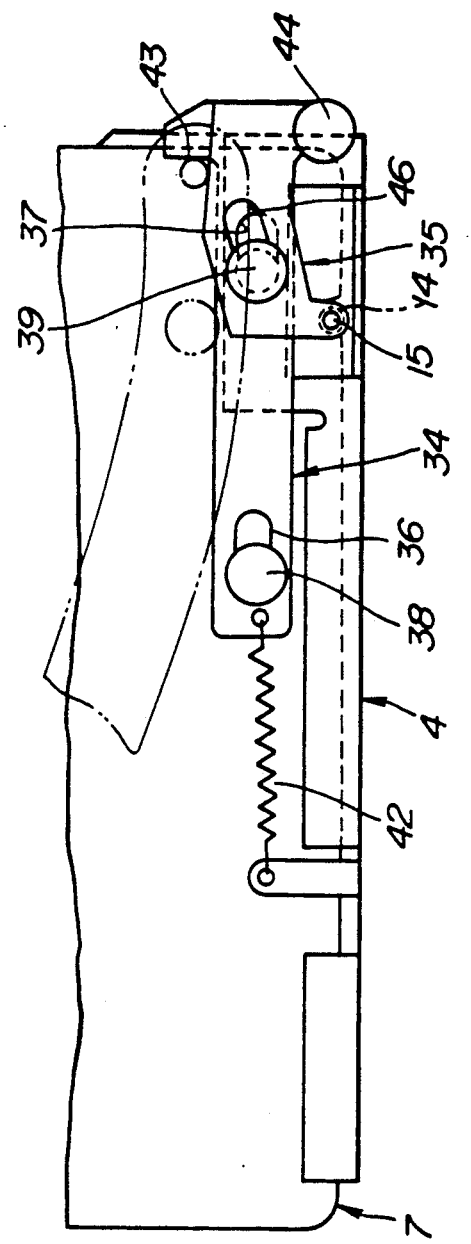

DISK DRIVE APPARATUS WITH SHUTTER LOCKING MECHANISM WHICH IS PREVENTIVE OF PLAY OF DISK CARTRIDGE IN LOADING CONDITION

BACKGROUND OP THE INVENTION

1. Field of the Invention

The present invention relates generally to a disk drive apparatus for driving a disk cartridge, such as a so-called micro-floppy disk cartridge, which has a sliding shutter for opening and closing a disk access opening. More specifically, the invention relates to a disk drive apparatus which has a cartridge holder having a cartridge insertion mouth for accepting and ejecting the disk cartridge.

2. Description of the Background Art

As is well known, a disk drive apparatus generally comprises a chassis with a turn table, a cartridge holder which is movable forward and aft in the chassis, and a shutter operating pin for opening and closing a sliding shutter of a disk cartridge. When the disk cartridge is inserted into the cartridge holder for loading, the shutter operating pin enters or engages with an operating pin receptacle formed in the shutter for causing sliding movement of the shutter for opening.

The shutter operating pin is carried by a shutter operating arm which is pivotable in both the shutter opening direction and the shutter closing direction. The shutter operating arm is biased toward an initial position, i.e. the shutter closing direction, by means of a return spring. When the disk cartridge is first inserted into the cartridge holder, the shutter operating pin engages with the operating pin receptacle. Upon further insertion of the disk cartridge, the shutter operating pin is axially displaced. The axial movement of the shutter operating pin causes pivotal movement of the shutter operating arm so as to cause lateral or transverse displacement of the shutter operating pin carrying the shutter. Therefore, when the disk cartridge is fully inserted, the shutter is placed at the fully opened position for permitting access to the disk. One example of the aforementioned type of conventional disk drive apparatus has been disclosed in Japanese Patent First (unexamined) Publication (Tokkai) Heisei 1-143064.

Such construction of the conventional disk loading mechanism of the disk drive apparatus is advantageous for simple manufacture and for allowing disk loading without requiring any drive power source. Furthermore, since the aforementioned construction is mechanically associated with the shutter operating mechanism, it may ensure automatic shutter opening operation. On the other hand, the return spring may constantly exert a spring force on the disk cartridge in order to resiliently place the disk cartridge to the eject position upon unloading. This creates difficulty in accurately chucking the disk in the disk drive mechanism.

In particular, the spring force of the return spring affects the disk loading mechanism, including the motor driven disk lifting mechanism for lifting the cartridge holder up and down between the disk loading and unloading positions. Namely, when the cartridge holder with disk cartridge inserted moves from the unloading position to the lowered loading position, the motion of the disk cartridge cannot be restricted until the positioning pin engages the disk cartridge. As a result, the disk cartridge can be pushed backward to project from the disk cartridge receptacle mouth of the cartridge holder.

In order to solve this problem, there has been proposed an arm lock mechanism for locking the shutter operating arm during the lifting operation of the disk lifting mechanism. The arm lock mechanism includes a lock rod which is provided for pivotal movement about a pivot shaft mounted on a lock base. The lock rod has a restricted angular range for pivotal motion and is biased by means of a spring. The arm lock mechanism becomes active when the cartridge holder approaches a position for initiating the operation of the disk lifting mechanism in order to shift the cartridge holder into the loading position, and to engage the lock rod to a lock rod receptacle which is cut-out of the shutter operating arm to prevent the latter from pivotally moving. Thus, the spring force of the return spring will not act on the disk cartridge held in the cartridge holder.

On the other hand, in the foregoing construction, since the shutter operating pin is provided on the cartridge holder and the arm lock mechanism is provided on the chassis, precise adjustment of the relative positions of the shutter operating pin and the arm lock mechanism becomes essential so that the arm lock mechanism is constantly effective. Excessive tolerance in the relative positions of the shutter operating pin and the arm lock mechanism may cause failure of the arm locking scheme, or in the alternative, incomplete shutter opening.

Furthermore, in the aforementioned construction, since the disk cartridge is not per se locked into the cartridge holder, it is still possible to withdraw the disk cartridge even after the arm lock mechanism locks the shutter operating arm. Therefore, if the disk cartridge is withdrawn immediately after the disk lifting mechanism starts, the movement of the disk cartridge causes damage to the disk and/or the magnetic head.

SUMMARY OF THE INVENTION

Therefore, it is an object of the present invention to provide a disk drive apparatus which can solve the problems or improve the drawbacks in the prior art as set forth above.

Another object of the present invention is to provide a disk drive apparatus which can lock the disk cartridge per se on a cartridge holder.

In order to accomplish these and other objects, a disk drive apparatus according to the present invention includes a shutter operating pin engageable with a pin receptacle on the shutter of a disk cartridge. The shutter operating pin is carried by a shutter operating arm which is pivotable for causing a transverse shift of the shutter operating pin for shifting the shutter from a closed position, at which a disk is inaccessible, to an open position, at which the disk is accessible. An arm lock mechanism is provided for locking the shutter operating arm in the shutter fully open position. The arm lock mechanism is provided in the cartridge holder. The cartridge holder is also provided with a cartridge lock mechanism which includes a cartridge lock pin engageable with a lock pin receptacle on the disk cartridge. The cartridge lock mechanism is actuated by having the shutter operating arm in the shutter fully open position, thereby establishing locking engagement of the cartridge lock pin with the lock pin receptacle of the disk cartridge.

According to one aspect of the invention, there is provided a disk drive apparatus for driving a recording medium disk housed within a disk cartridge, said disk cartridge having a disk access window and a sliding shutter, comprising:

a chassis;

a disk driving mechanism including a disk chucking means for chucking the disk on a turn table for rotatingly driving the disk, the disk driving mechanism being mounted on the chassis;

a cartridge holder for receiving the disk cartridge and for carrying the disk cartridge between a predetermined unloading position at which the disk cartridge is externally accessible for insertion and extraction and a predetermined loading position at which the disk is chucked by the disk chucking means;

a cartridge holder lifting mechanism for shifting the cartridge holder between the unloading and loading positions;

a shutter operating means incorporated in the cartridge holder for shifting the shutter between an open position in which the disk access window is open for reading and/or writing information on the disk and a closed position in which the disk access window is blocked, the shutter operating means including a pivotal arm for carrying the shutter between the open and closed positions according to the relative positions of the disk cartridge and the cartridge holder;

an arm lock means incorporated in the cartridge holder for locking the pivotal arm at a position corresponding to the fully open position of the shutter; and a cartridge lock means incorporated in the cartridge holder for locking the disk cartridge within the cartridge holder, the cartridge lock means being engaged when the disk cartridge is fully inserted within the cartridge holder.

In the preferred construction, the cartridge lock means cooperates with the pivotal arm so that the latter may bias the former to a position where locking of the disk cartridge is established. Also, the disk drive apparatus further comprises arm lock releasing means on the chassis and which unlocks the arm lock means while the cartridge holder lifting mechanism is shifting the cartridge holder between the unloading position and the loading position, so that locking of the pivotal arm by the arm lock means is released when the cartridge holder is near the loading position.

The cartridge lock means comprises a slide plate movable within the cartridge holder in the direction of motion of the disk cartridge, said movement depending upon the relative positions of the disk cartridge and the cartridge holder, and a pivotal lever carrying a cartridge locking pin, the pivotal lever cooperating with the slide plate to engage the cartridge locking pin into a locking pin receptacle in the disk cartridge at the fully inserted position of the disk cartridge. The slide plate cooperates with the pivotal arm of the shutter operating means to be biased to a position for establishing locking engagement between the cartridge locking pin and the locking pin receptacle at the locked position of the pivotal arm by the arm lock means.

BRIEF DESCRIPTION OF THE DRAWINGS

The present invention will be understood more fully from the detailed description given herebelow and from the accompanying drawings of the preferred embodiment of the invention, which, however should not be taken to limit the invention to the specific embodiment but are for explanation and understanding only.

In the drawings:

FIG. 4 is a plan view showing a cartridge lock mechanism in the cartridge unlocking position;

FIG. 5 is a similar plan view to FIG. 4 but showing the cartridge lock mechanism in the cartridge locking position;

DESCRIPTION OF THE PREFERRED EMBODIMENT

Figure 1:
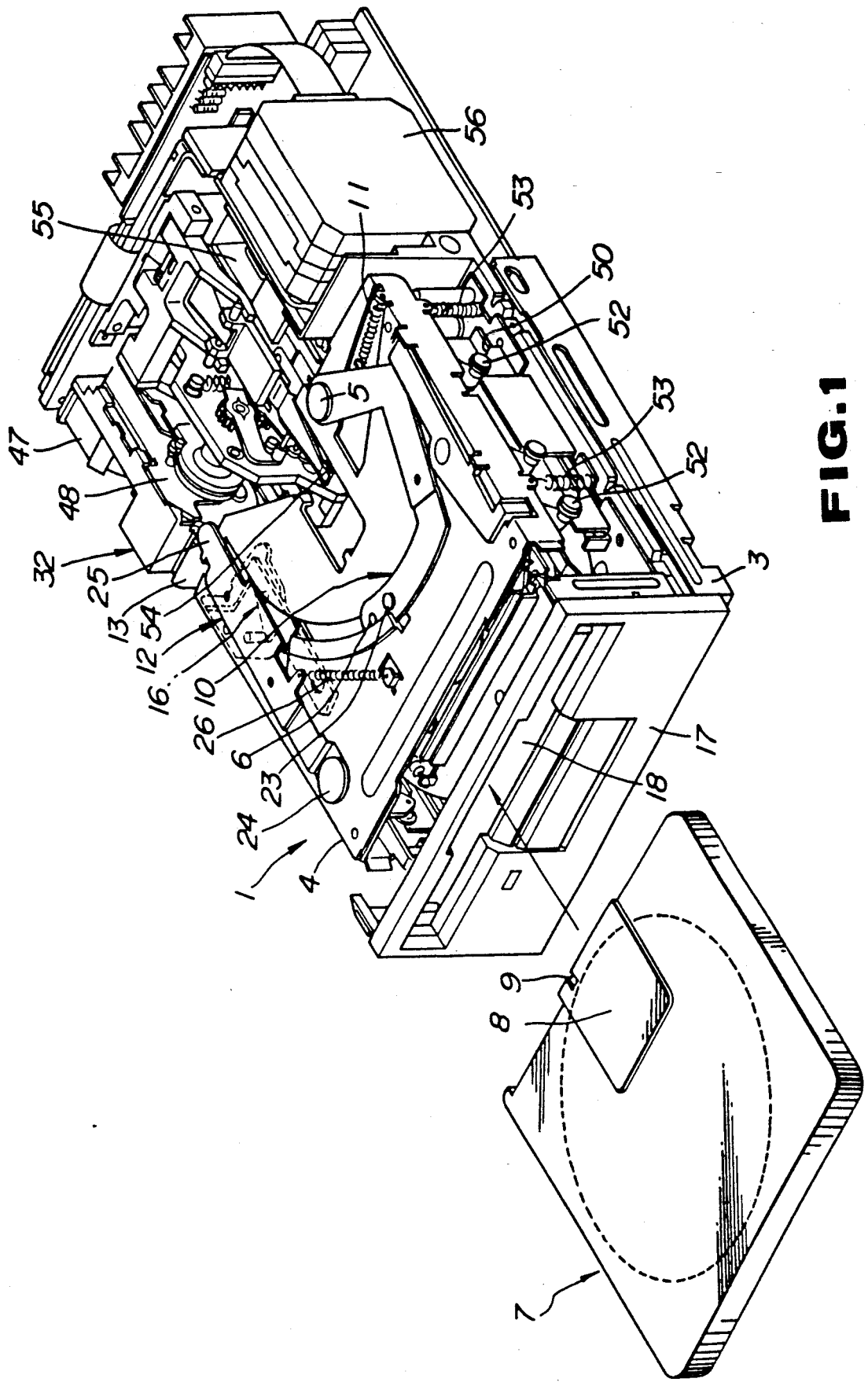
FIG. 1 is a perspective view of the preferred embodiment of a disk drive apparatus according to the present invention.
Figure 2:
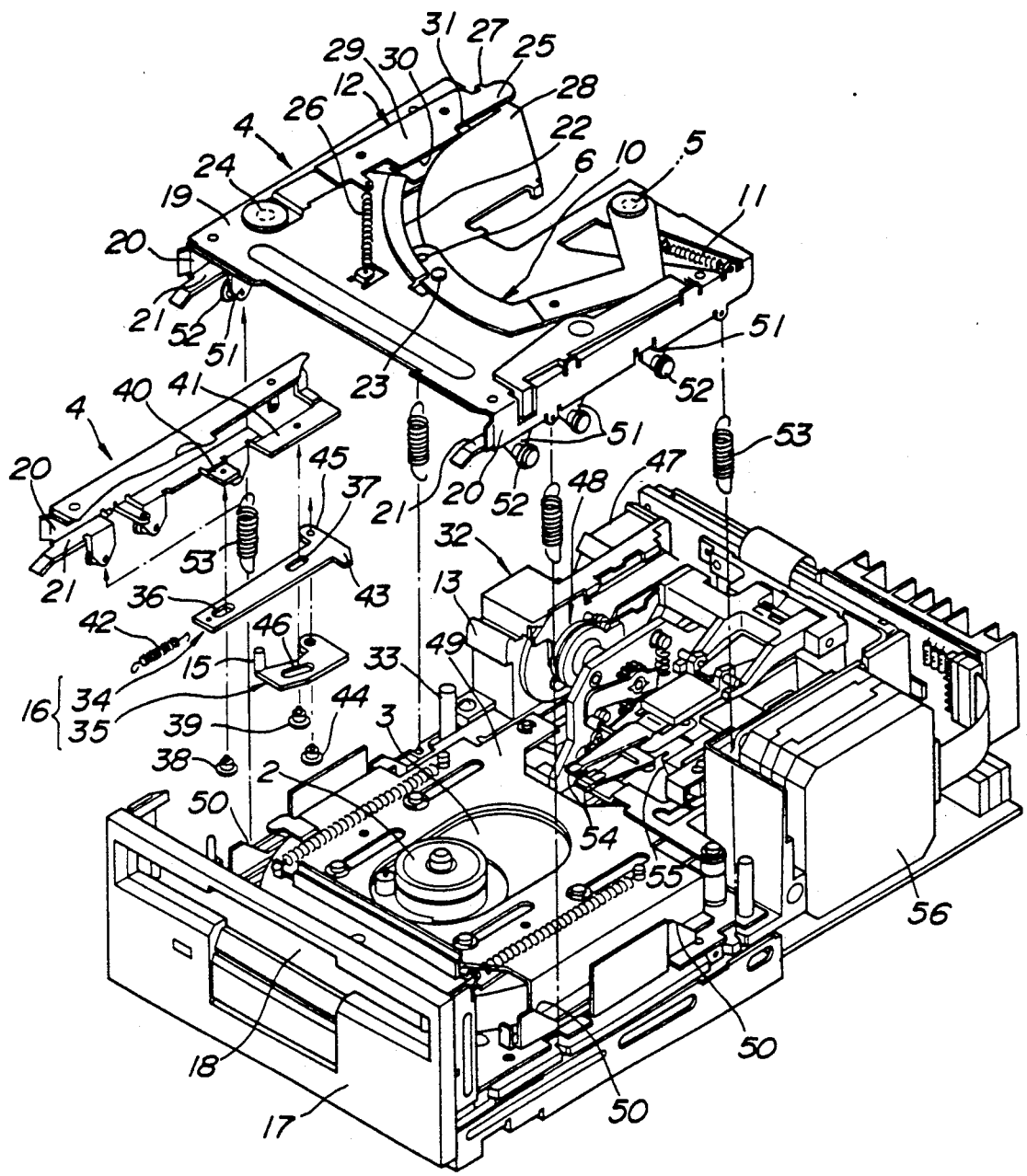
FIG. 2 is an exploded perspective view of the preferred embodiment of a disk drive apparatus of FIG. 1.

Referring now to the drawings, particularly to FIGS. 1 and 2, the preferred embodiment of a disk drive apparatus according to the present invention is generally represented by the reference numeral "1". The disk drive apparatus 1 has a chassis 3 with a turn table 2. A cartridge holder 4 is positioned on the chassis 3 for movement forward and aft in the chassis. A shutter operating arm 10 is pivotally mounted on the cartridge holder 4 for pivotal movement about a pivot 5. The shutter operating arm 10 is associated with a return spring 11 which constantly biases the shutter operating arm toward the initial position corresponding to the fully closed position of a shutter 8 of a disk cartridge 7. The shutter operating arm 10 carries a shutter operating pin 6. The shutter operating pin 6 is so designed as to engage with an operating pin receptacle cut-out 9 of the shutter 8 of the disk cartridge 7. The shutter operating arm 10 is pivotally moved with the shutter operating pin 6 which engages with the pin receptacle cut-out 9 of the shutter 8 when the disk cartridge is inserted into the cartridge holder 4. During insertion of the disk cartridge 7, the shutter operating pin 6 shifts in the direction of insertion of the disk cartridge according to the forward movement thereof. This forward shifting of the shutter operating pin 6 causes pivotal movement of the shutter operating arm 10 against the spring force of the return spring 11. Pivotal movement of the shutter operating arm 10 naturally causes transverse displacement of the shutter operating pin 6 with the shutter 8. The magnitude of transverse displacement of the shutter operating pin 6 during insertion of the disk cartridge 7 is so determined as to fully open the shutter 8 adjacent to the end of the insertion stroke.

An arm lock member 12 is also provided on the cartridge holder 4. The arm lock member 12 is so designed as to lock the shutter operating arm 10 when the disk cartridge 7 is fully inserted to be shifted down to a predetermined loading position. The arm lock member 12 is associated with an arm lock release member 13 which is mounted on the chassis 3. The arm lock release member 13 is designed to be active when the cartridge holder is at a predetermined position between the unloading height position and the loading height position. Therefore, during movement from the unloading height position to the loading height position, the arm lock established on the shutter operating arm 10 by the arm lock member 12 is released.

Since the disk cartridge 7 is not per se locked on the cartridge holder 4, it is still possible to withdraw the disk cartridge even after the arm lock mechanism 12 locks the shutter operating arm 10. Therefore, if the disk cartridge is withdrawn immediately after the disk lifting mechanism starts to operate, movement of the disk cartridge will cause damage to the disk and/or the magnetic head. In order to prevent this, the shown embodiment of the disk drive apparatus is provided with a cartridge lock mechanism 16.

Figure 3:
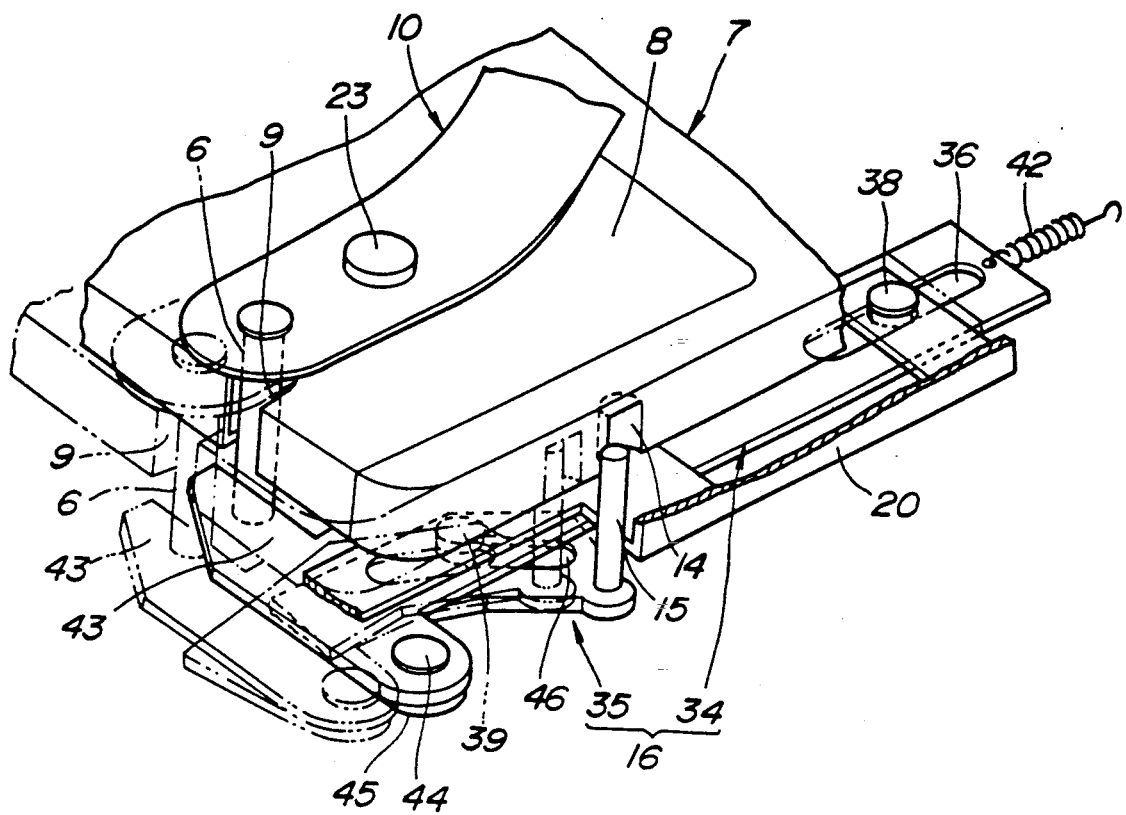
FIG. 3 is an enlarged and partially sectioned perspective view of the major part of the preferred embodiment of the disk drive apparatus of FIG. 1.
Figure 6:
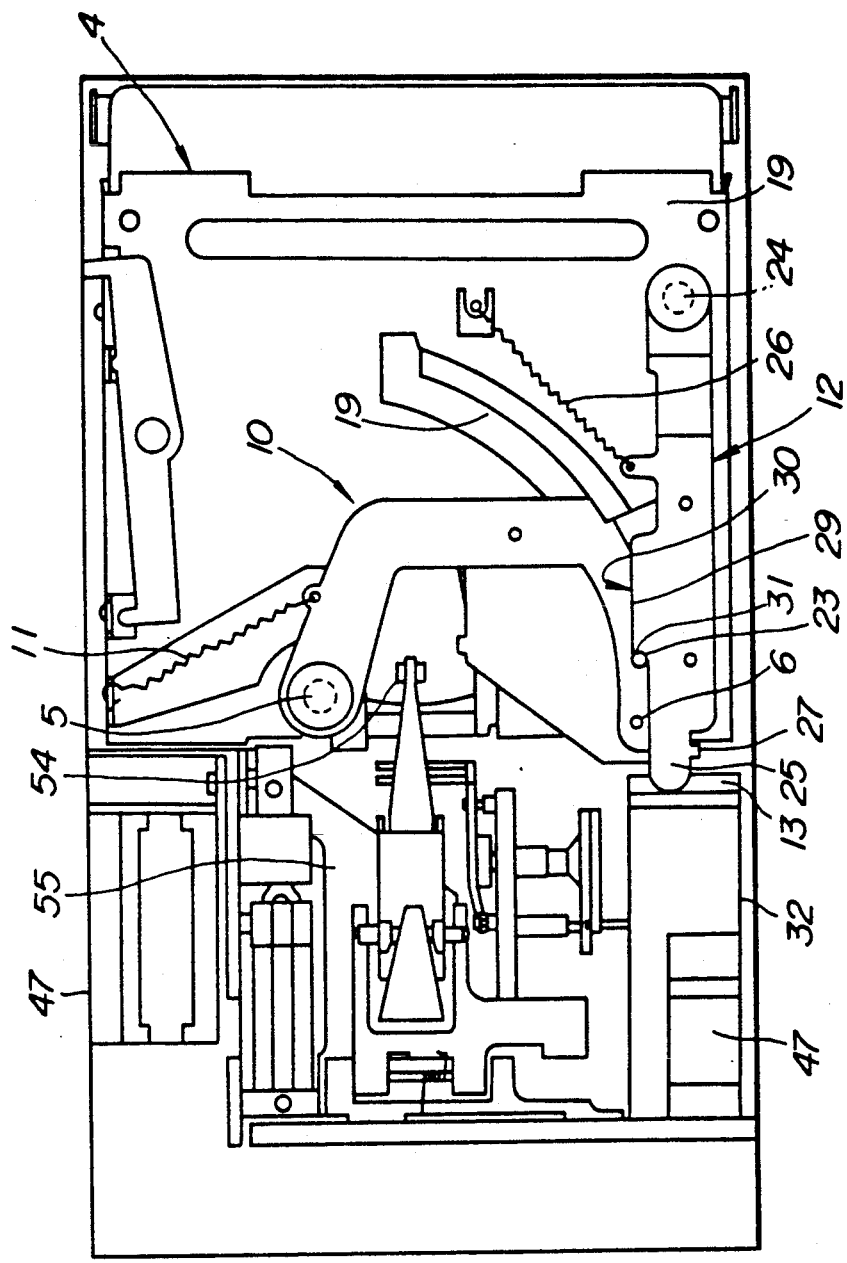
FIG. 6 is a plan view of the preferred embodiment of the disk drive apparatus of FIG. 1 in which an arm lock mechanism is in its locking state.
Figure 7:
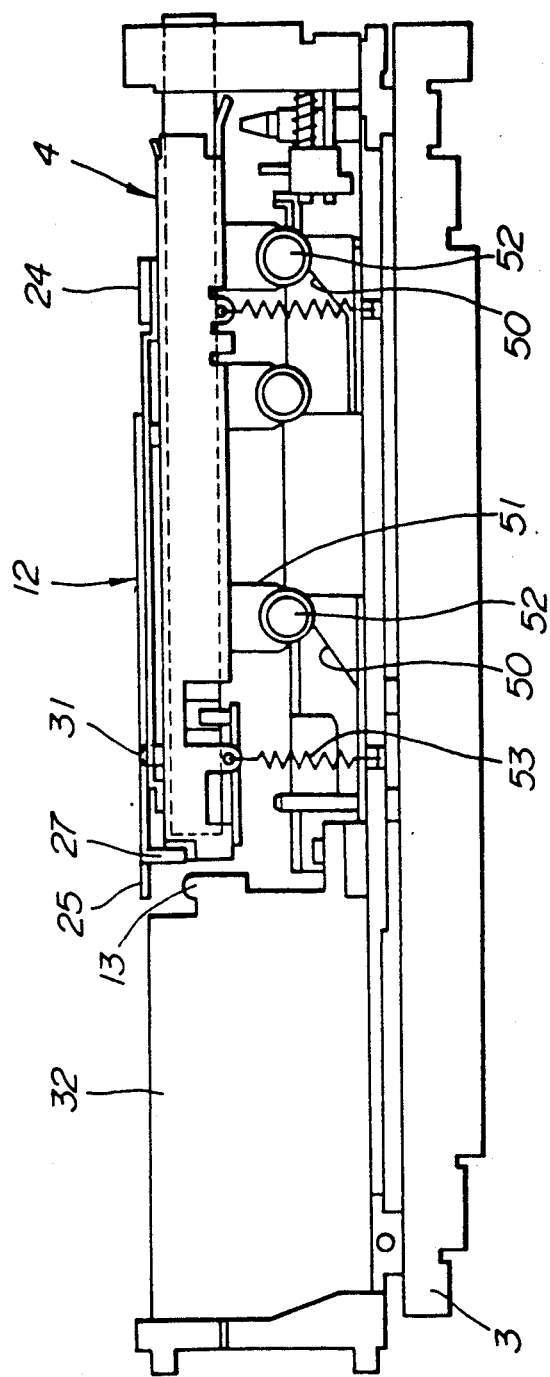
FIG. 7 is a side elevation showing the arm lock mechanism placed in its arm locking state.
Figure 8:
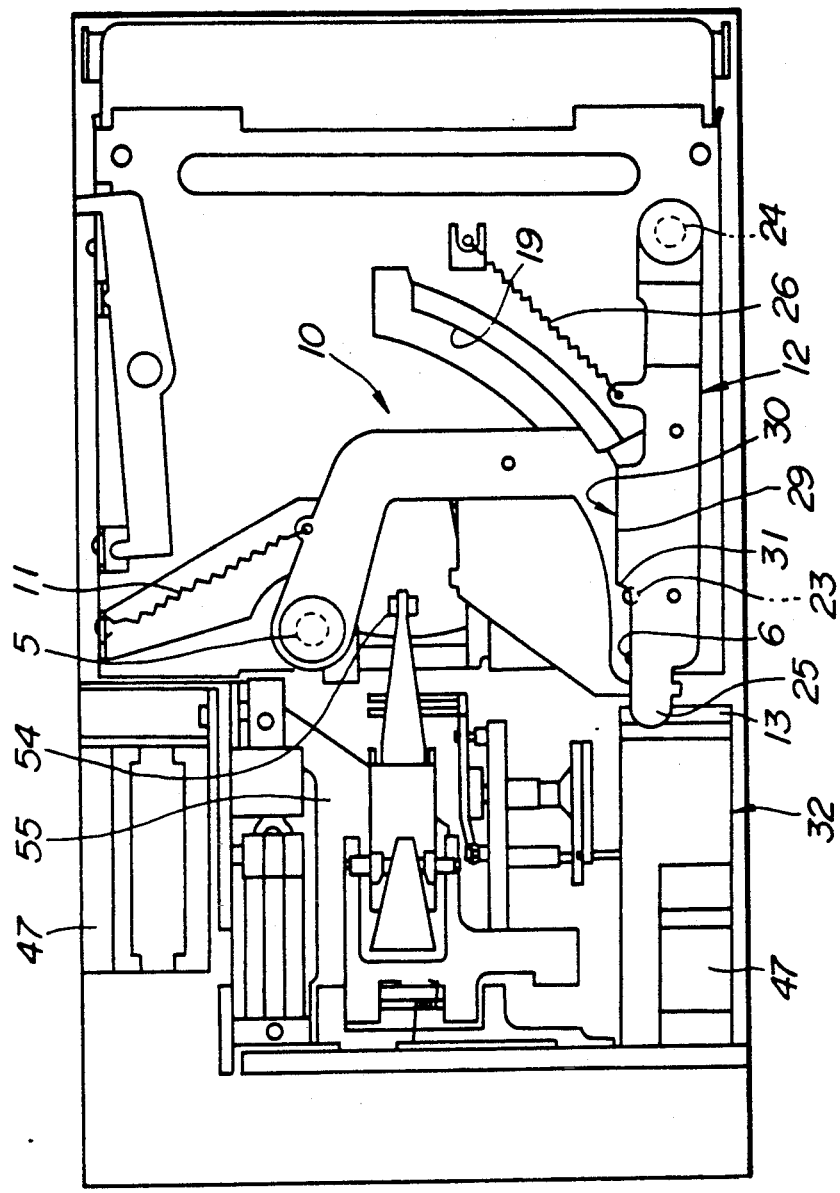
FIG. 8 is a plan view of the preferred embodiment of the disk drive apparatus, showing the arm lock mechanism in its lock released state.
Figure 9:
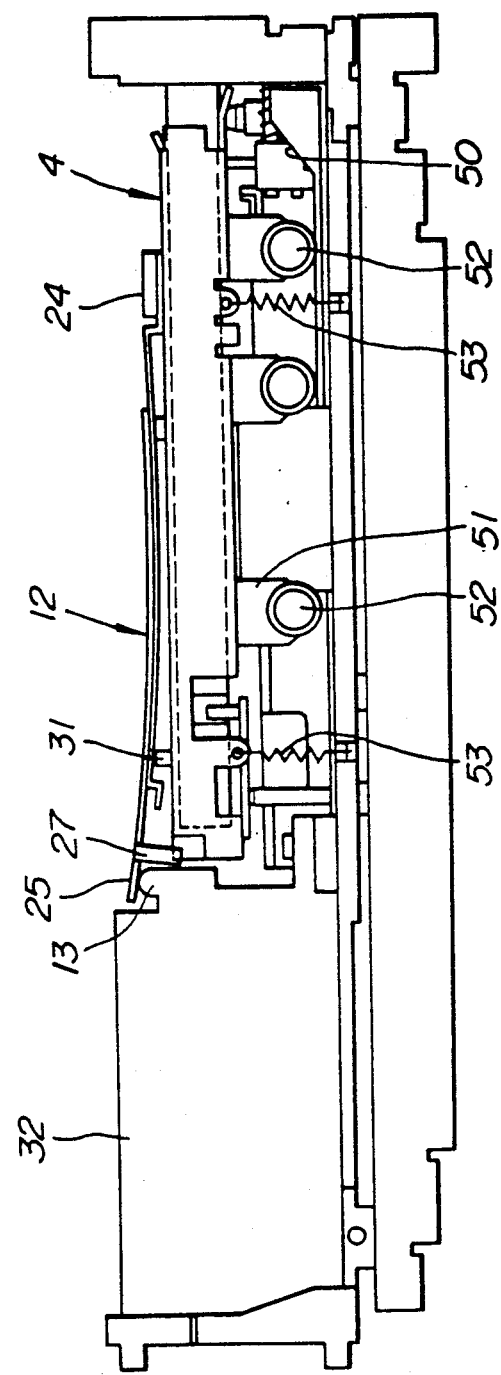
FIG. 9 is a side elevation of the showing the arm lock mechanism placed in its arm lock released state.

As shown in FIGS. 3 to 5, the cartridge holder lock mechanism 16 is incorporated in the cartridge holder 4. The cartridge lock mechanism 16 includes a cartridge lock pin 15 which is engageable with a cartridge lock pin receptacle cut-out 14 of the disk cartridge 7 for preventing the disk cartridge from coming out of the cartridge holder. The cartridge lock mechanism 16 cooperates with the shutter operating arm 10 and is actuated by the latter at the shutter fully open position to cause the cartridge lock pin 15 to shift and enter into engagement with the pin receptacle cut-out 14 of the disk cartridge 7 within the cartridge holder 4.

The chassis 3 is formed of aluminum alloy and is essentially rectangular-shaped. A front panel 17 is attached on the front end edge of the chassis 3. The front panel 17 defines a disk cartridge insertion slot 18. The cartridge holder 4 is placed in alignment with the disk cartridge insertion slot 18 while the disk is not loaded, so that the disk cartridge can be inserted into the cartridge holder therethrough.

The cartridge holder 4 is formed into an essentially rectangular box-shaped configuration by bending or pressing a metal plate. Therefore, the cartridge holder 4 has an upper plate section 19, a pair of side wall sections 20 extending essentially perpendicular to the upper plate section, and a pair of cartridge supporting strips 21 extending from the ends of the side walls remote from the upper plate section in an essentially parallel relationship with the upper plate section. The upper plate section 19, the side walls 20 and the cartridge supporting strips 21 define a cartridge receptacle space. The cartridge holder 4 is mounted on the chassis 3 in movable fashion for movement forward and aft in the chassis between the disk unloading position, in which the cartridge holder 4 is placed in alignment with the cartridge insertion slot 18 for permitting insertion and extraction of the disk cartridge 7, and the disk loading position, in which the cartridge holder 4 is shifted toward the chassis while carrying the disk cartridge for loading the disk.

The shutter operating arm 10 is formed into an essentially V- or U-shaped configuration and has one end pivotably connected to the upper plate section 19 of the cartridge holder 4 for pivotal movement about the pivot 5 as set forth above. The other end of the shutter operating arm 10 is engaged to a arc-shaped slot 22 formed through the upper plate section 19 of the cartridge holder 4 so that the shutter operating arm may be pivotally moved in a predetermined angular range. The shutter operating pin 6 extends through the slot 22 for engagement with the pin receptacle cut-out 9 of the shutter 8 of the disk cartridge 7. An arm lock pin 23 is also carried with the shutter operating arm 10. The arm lock pin 23 is used to engage the arm lock member 12 for locking the shutter operating arm 10 at the shutter fully open position as set forth above.

As shown in FIGS. 6 to 9, the arm lock member 12 is provided along one side edge of the upper plate section 19 of the cartridge holder 4. The arm lock member 19 is formed of a resilient metal plate and formed into an essentially rectangular configuration. The front side end of the arm lock member 12 is pivotally connected to the upper plate section 19 of the cartridge holder 4 via a pivot 24. The arm lock member 12 has an extension tongue 25 in the rear end remote from the front plate. The extension tongue 25 extends rearwardly from the rear end of the upper plate section 19 of the cartridge holder 4. The orientation of the extension tongue 25 corresponds to the planar orientation of the arm lock release member 13 on the chassis 3. Therefore while the cartridge holder 4 carrying the disk cartridge 7 shifts from the unloading position to the loading position, the extension tongue 25 comes into contact with the arm lock release member 13 to cause upward and resilient deformation of the arm lock member 12 for releasing the arm locking engagement between the arm lock pin 23 and the arm lock member 12. A stopper strip 27 extends from the one side edge of the extension tongue 25. The stopper strip 27 cooperates with a stopper edge 28 of the cartridge holder 4 for restricting the angular range of pivotal movement of the arm lock member 12.

A coil spring 26 is provided for providing a bias force for the arm lock member 12. One end of the coil spring 26 is thus engaged to a spring rest extension integrally formed with the arm lock member 12. The other end of the coil spring 26 is connected to a spring rest bracket integrally formed with the upper plate section 19 of the cartridge holder 4. With this construction, the arm lock member 12 is normally biased toward the shutter operating arm 10. Pivotal movement of the arm lock member 12 as biased by the coil spring 26 is limited by the stopper strip 27 abutting against the stopper edge 28. At the angular position where the stopper strip 27 contacts with the stopper edge 28, the arm lock member 12 is placed in an essentially parallel relationship with the side edge of the upper plate section 19 of the cartridge holder 4. At this position, an arm locking strip 29 formed integrally with the arm lock member 12 is oriented above the arc-shaped slot 22. When the disk cartridge 7 is inserted into the cartridge holder 4 to cause pivotal movement of the shutter operating arm 10, the arm lock pin 23 comes into contact with the side edge 30 of the arm locking strip 29 of the arm lock member 12. Thus, the arm lock member 12 is pivotally moved away from the shutter operating arm 10 against the spring force of the coil spring 26. This permits the shutter operating arm 10 to further pivotally move toward the shutter fully open position. At the end of pivotal movement of the shutter operating arm 10 to reach the shutter fully open position, the arm lock pin 23 moves away from the side edge 30 to permit pivotal movement of the arm lock member 12 toward the shutter operating arm 10. As a result, a locking edge 31 of the arm locking strip 29 comes into engagement with the arm lock pin 23. Therefore, the shutter operating arm 10 has restricted movement when the cartridge holder 4 moves from the loading position to the unload position.

In a practical construction, the arm lock release member 13 is formed integrally with a motor housing 32 which is made of a synthetic resin. The height of the arm lock release member 13 is designed so that the arm lock release member 13 is maintained away from the extension tongue 25 of the arm lock member 12 when the cartridge holder 4 is maintained at the unloading position, and so that the arm lock release member 13 comes into contact with the extension tongue for causing deformation during travel of the cartridge holder 4 from the unloading position to the loading position, and so that the arm lock member 12 is deformed enough to release the stopper edge 31 of the locking edge 29 from locking engagement with the arm lock pin 23 slightly before the cartridge holder reaches the loading position.

In the shown embodiment, the motor housing 32 houses a motor 47 for driving a cartridge holder lifting mechanism for lifting the cartridge holder up and down between the unloading position and the loading position. The driving torque of the motor 47 is transmitted via a power train 48 for driving a lifter base plate 49 forward and backward. The lifter base plate 49 has a lifter guide extending essentially perpendicular to the general surface thereof. The lifter guide has tapered cam faces 50 mating with rollers 52 which are supported on the supporting strips 21 of the cartridge holder 4 by means of mounting brackets 51. Thus, the lifter base plate 49 is initially placed at a backwardly shifted position to lift the cartridge holder up to the initial unloading position. When the disk cartridge is fully inserted, the motor 47 drives the lifter base plate frontwardly to lower the cartridge holder 4 down to the disk loading position in the aid of a downward biasing force exerted by coil springs 53. The magnetic disk housed within the disk cartridge 4 is then chucked on the turn table for driving. Finally, a magnetic head 54 carried by a head carriage 55 is radially shifted for tracking by means of a stepping motor 56.

Additionally, at the loading position, positioning pins 33 engage with positioning pin receptacle bore (not shown) of the disk cartridge 7 for positioning the disk cartridge 7 accurately on the turn table for accurate chucking.

As shown in FIGS. 2 to 5, the cartridge lock mechanism 16 has a slide plate 34. The slide plate 34 is cooperative with the shutter operating pin 6 on the shutter operating arm 10 so that the slide plate can be shifted rearwardly according to rearward movement of the shutter operating pin 6. A pivotal lever 35 carries the cartridge lock pin 15 and is associated with the slide plate 34 for pivotal movement according to rearward movement of the slide plate. By pivotal movement of the pivotal lever 35, the cartridge lock pin 15 comes into engagement with the cartridge lock pin receptacle cut-out 14 of the disk cartridge 7 for locking the disk cartridge on the cartridge holder.

The slide plate 34 is formed of metal into an essentially rectangular shaped configuration. The slide plate 34 is formed with a pair of elongated slide guide slots 36 and 37. Slide guide pins 38 and 39 extend through the slide guide slots 36 and 37. The slide guide pins 38 and 39 are supported on support strips 40 and 41 extending transversely from the cartridge support strip 21 by engaging the fastening pin sections at the top thereof through openings formed on the support straps. A coil spring 42 is provided for biasing the slide plate 34 frontwardly.

As can be clearly seen from FIG. 2, the slide plate 34 has a transversely extending jaw section 43. At the initial position, the slide plate 34 is so oriented as to place the jaw section 43 within the arc-shaped trace of the shutter operating pin 6. Therefore, after a given angle of angular displacement according to insertion of the disk cartridge 7, the shutter operating pin 6 carrying the shutter 8 comes into engagement with the jaw section 43 of the slide plate 34 and causes sliding movement of the latter.

The pivotal lever 35 is also a metal plate and it is oriented in overlapping fashion with the slide plate 34. The pivotal lever 35 has a transverse extension having a through opening. A connecting pin 44 extends through the through opening in the transverse extension and engages with the opening formed through connecting strip 45 of the slide plate 34. An elongated opening 46 is formed in the mid portion of the pivotal lever 35. The elongated opening 46 receives the slide guide pin 39.

As shown in FIG. 4 when the slide plate 34 is placed at the initial and unlocking position, the slide guide pin 39 is placed at the end of the elongated opening 46 adjacent to the pin 44. At this position, the pivotal lever 35 is pivoted to place the cartridge lock pin 15 out of the cartridge lock pin receptacle cut-out 14 of the disk cartridge 7.

When the disk cartridge 7 is fully inserted into the cartridge holder 4 as illustrated in FIG. 5, the end of the cartridge presses the jaw section 43 of the slide plate 34 and causes the slide plate to shift in the disk cartridge inserting direction. With this sliding movement of the slide plate 34, the guide pin 39 is shifted to the other end of the elongated slot 46 remote from the pin 44 and by further movement of the slide plate, the pivotal lever 35 is pivotally moved toward the side edge of the disk cartridge 7. As a result, the cartridge lock pin 15 enters into engagement with the pin receptacle cut-out 14 for locking the disk cartridge within the cartridge receptacle space in the cartridge holder. As set forth above, at this position, the shutter operating arm 10 is locked [to be] so as to prevent pivotal movement back to the initial position by locking engagement between the arm lock pin 23 and the locking edge 31 of the arm lock member 12.

When the disk cartridge 7 is inserted through the disk cartridge insertion slot 18 of the front plate 17 into the cartridge holder 4, the shutter operating pin 6 engages with the pin receptacle cut-out 9 of the shutter 8 which is initially placed at the fully closed position. As the disk cartridge 7 advances within the cartridge holder 4, the shutter operating arm 10 with the shutter operating pin 6 pivots in the shutter opening direction to cause transverse shifting of the shutter to open the disk access window.

As the disk cartridge nears the end of the insertion stroke, the arm lock member 12 comes into engagement with the arm lock pin 23 on the shutter operating arm 10 at locking edge 31. Thus, the spring force of spring 26 acting on the shutter operating arm no longer acts on the disk cartridge 7 placed in the cartridge holder. At substantially the same time the cartridge lock mechanism 16 becomes active to cause pivotal movement of the pivotal lever 35 carrying the cartridge lock pin 15. At the end of the pivotal movement of the pivotal lever 35, the cartridge lock pin 15 enters into engagement with the pin receptacle cut-out for establishing locking engagement.

Then, the motor 47 drives the lifter base plate 49 frontwardly for causing downward movement of the cartridge holder 4 as downwardly biased by the springs 53. During downward movement of the cartridge holder, the extension strip 25 of the arm lock member 12 comes into contact with the arm lock release member 13. By further downward movement the arm lock member 12 is resiliently deformed for releasing the locking engagement between the arm lock pin 23 and the locking edge 31 of the arm lock member 12, at the position adjacent to the end of downward motion stroke.

As can be appreciated, the disk cartridge can be stably locked within the cartridge holder 4 without permitting play of the disk cartridge within the cartridge holder. Therefore, stable chucking of the disk can be established.

What is claimed is:

1. A disk drive apparatus for driving a recording medium disk housed within a disk cartridge having a disk access window and a sliding shutter, comprising:
   a chassis;
   a disk driving mechanism including disk chucking means for chucking the disk on a turn table and for rotatingly driving the disk, said disk driving mechanism being mounted on the chassis;
   cartridge holder for receiving the disk cartridge and for carrying the disk cartridge between a predetermined unloading position at which said disk cartridge is externally accessible for insertion and extraction and a predetermined loading position at which the disk is chucked by the disk chucking means;
   a cartridge holder lifting mechanism for shifting said cartridge holder between said unloading and loading positions;
   shutter operating means incorporated in said cartridge holder for shifting said sliding shutter between an open position in which said disk access window is exposed for reading and/or writing information on the disk and a closed position in which said disk access window is blocked, said shutter operating means including a pivotal arm for carrying said sliding shutter between said open and closed positions according to the relative positions of said disk cartridge and said cartridge holder;
   arm lock means incorporated in said cartridge holder for locking said pivotal arm at a position corresponding to the fully open position of said shutter; and,
   cartridge lock means incorporated in said cartridge holder for locking said disk cartridge within said cartridge holder, said cartridge lock means being engaged when said disk cartridge is fully inserted within said cartridge holder,
   wherein said cartridge lock means comprises a slide plate movable within said cartridge holder in the direction of motion of said disk cartridge, said movement depending upon the relative position of said disk cartridge and said cartridge holder, and a pivotal lever carrying a cartridge locking pin, said pivotal lever being cooperated with said slide plate to engage said cartridge locking pin into a locking pin receptacle in said disk cartridge at the fully inserted position of said disk cartridge; and,
   wherein said side plate is biased by said pivotal arm of said shutter operating means to a position for establishing locking engagement between said cartridge locking pin and said locking pin receptacle at the locked position of said pivotal arm by said arm lock means.

2. A disk drive apparatus as set forth in claim 1, which further comprises arm lock releasing means on said chassis, said arm lock releasing means unlocking said arm lock means while said cartridge holder lifting mechanism is shifting said cartridge holder to said unloading position from said loading position, so that locking of said pivotal arm by said arm lock means is released when the cartridge holder is near said loading position.

* * * * *